US006394661B1

(12) United States Patent
Cull et al.

(10) Patent No.: US 6,394,661 B1
(45) Date of Patent: May 28, 2002

(54) FIBER OPTIC CONNECTOR HAVING RECEPTACLE HOUSING FOR RADIALLY ALIGNING MATING INSERTS

(75) Inventors: Bryan D. Cull, Allen; Kerry W. Whitaker, Plano; Daniel C. Roehrs, McKinney, all of TX (US)

(73) Assignee: Fiber Systems International, Richardson, TX (US)

( * ) Notice: Subject to any disclaimer, the term of this patent is extended or adjusted under 35 U.S.C. 154(b) by 11 days.

(21) Appl. No.: 09/666,693

(22) Filed: Sep. 21, 2000

Related U.S. Application Data
(60) Provisional application No. 60/119,227, filed on Feb. 9, 1999.

(51) Int. Cl.[7] .................................................. G02B 6/38
(52) U.S. Cl. .............................. 385/59; 385/60; 385/69; 385/71; 385/77
(58) Field of Search ............................. 385/58, 59, 60, 385/69, 71, 77

(56) References Cited

U.S. PATENT DOCUMENTS

| | | | | |
|---|---|---|---|---|
| 4,812,007 A | * | 3/1989 | Lukas .................... 350/96.21 |
| 5,285,510 A | * | 2/1994 | Slaney ......................... 385/78 |
| 5,394,497 A | * | 2/1995 | Erdman et al. ................ 385/78 |
| 5,515,466 A | * | 5/1996 | Lee .............................. 385/78 |
| 6,081,647 A | * | 6/2000 | Roth et al. ................... 385/139 |
| 6,179,481 B1 | * | 1/2001 | Sung ............................ 385/78 |
| 6,305,849 B1 | * | 10/2001 | Roehrs et al. ................ 385/59 |

* cited by examiner

Primary Examiner—Akm E. Ullah
Assistant Examiner—Jennifer Doan
(74) Attorney, Agent, or Firm—Howison, Thoma & Arnott, L.L.P.

(57) ABSTRACT

A multi-channel fiber optic connector is provided having a plug connector half and a receptacle connector half. The plug and the receptacle have respective inserts that include exterior peripheries of a particular shape for mating with an interior profile of a housing of the receptacle. The peripheries of the inserts are preferably defined by cylindrical bodies having respective tabs which protrude outward from the outer diameters of the inserts. The interior profile of the receptacle housing defines a recess for receiving the tabs to both angularly align the insert associated with the receptacle and to angularly align the insert associated with the plug. The recess in the receptacle housing is defined by a groove which extends parallel to the longitudinal length of the receptacle housing, with the same groove receiving the protuberant tabs of both inserts to angularly align the inserts. The inserts have fiber optic termini mounted therein.

20 Claims, 7 Drawing Sheets

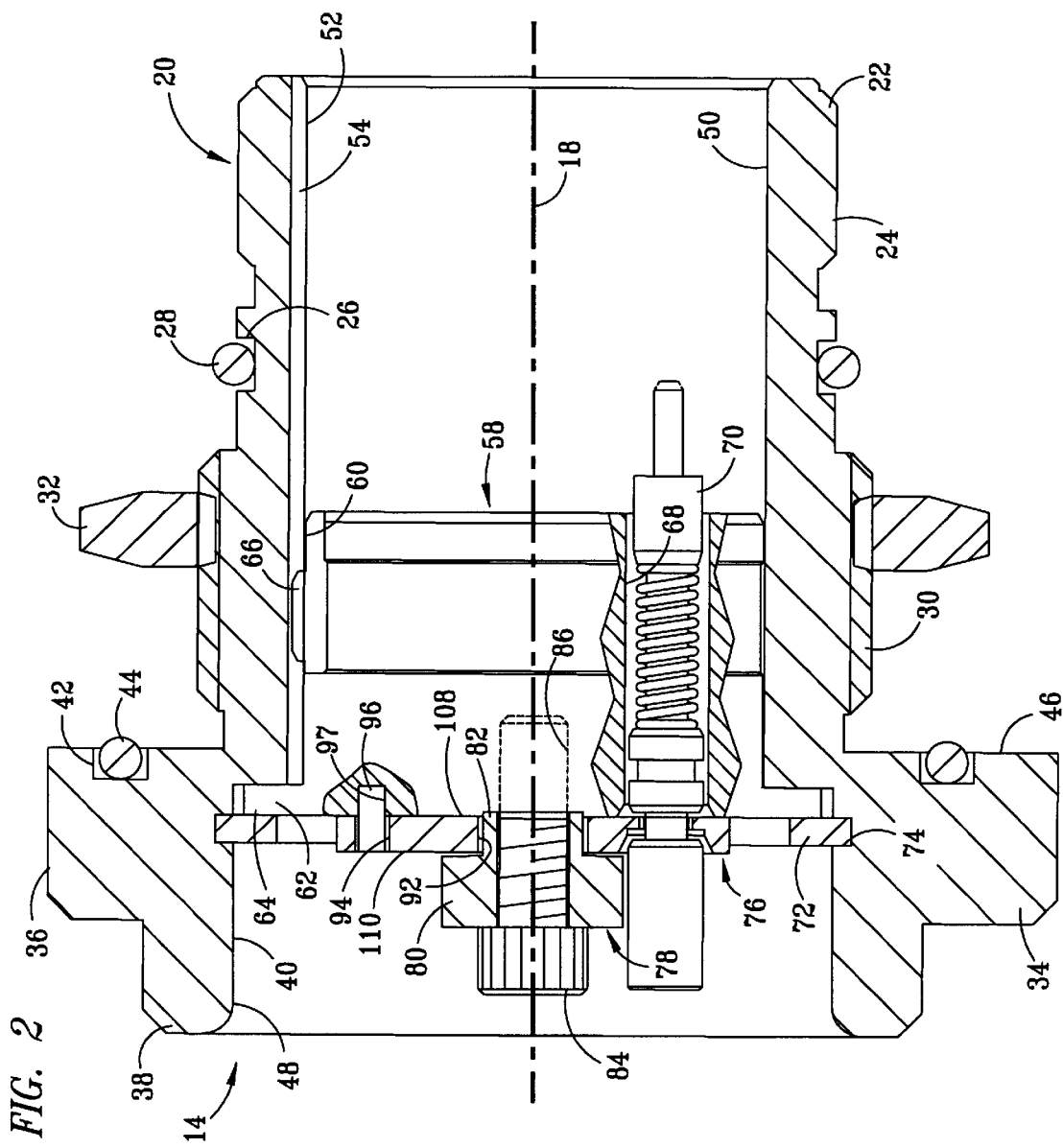

FIBER OPTIC CONNECTOR HAVING RECEPTACLE HOUSING FOR RADIALLY ALIGNING MATING INSERTS

CROSS-REFERENCE TO RELATED APPLICATIONS

The present application is related to U.S. patent application Ser. No. 09/440,025, filed Nov. 12, 1999, and entitled "FIBER OPTIC CONNECTOR," which is a Continuation-in-Part of U.S. Provisional Patent Application Ser. No. 60/119,227 filed Feb. 9, 1999 and entitled "FIBER OPTIC CONNECTOR."

TECHNICAL FIELD OF THE INVENTION

The present invention relates in general to optical fiber light transmission systems, and in particular to connectors for use in coupling optical fiber conductors together.

BACKGROUND OF THE INVENTION

Prior art fiber optic cable connectors have been provided for joining cables which contain optical fibers. The cables are coupled so that the end faces of terminal ends of the optical fibers of different cables are aligned along respective mating planes for transmitting light signals between mated optical fibers. Such fiber optic connectors have been provided for single channel, multi-channel, single mode and multi-mode cables. The terminal ends of the optical fibers contained in such cables are typically included within termini, which include ferrules that extend over the terminal ends of cores of the optical fibers. The terminal ends of the optical fibers pass through the ferrules, with the terminal end faces of the optical fibers fitting flush with terminal ends of the ferrules. When two of the cables are coupled together, opposing ferrules are mated together in an abutting arrangement, with the terminal end faces of the optical fibers coaxially aligned along a mating plane for transmitting light signals therebetween. The alignment between two of the mating ferrules is critical in order to eliminate transmission losses which occur due to diffusion and reflection of the light being transmitted between mated optical fibers.

In some applications, adjacent optical fibers have been coupled using expanded beam-type termini connection, in which the light signals from one of the optical fibers is expanded, or spread apart, and then collimated upon exiting a terminal end of a first one of the mating termini. The collimated light signals are then received by a second one of the termini that focuses the light into a single one of the optical fibers. The termini of adjacent ones of the optical fibers have been coupled utilizing split sleeves. The split sleeves are split along one side by a slot that runs the full longitudinal length of respective ones of the sleeves, typically parallel to the longitudinal length of the optical fibers so that the sleeves act like a resilient, spring-like member to clamp down on the exterior of the termini to align the two mating optical fibers. The two mating termini are usually gimbaled such that the terminal ends of the termini are free to angularly move along arcuate paths which extend transversely to the longitudinal length of the sleeve. This allows the terminal ends of respective ones of the termini, that is, the axes of the termini, and the optical fibers, to be coaxially aligned when being fitted within the split sleeves. In some prior art connectors, O-ring seals have been used to both seal against respective ones of the termini, and also to provide gimbal surfaces for allowing annular alignment of the axes of the termini being mated.

In some fiber optic cabling applications, connectors are selected such that certain types of connectors will not intermate with other types of connectors, such as to prevent the connection of particular devices to one another. Connectors of different size and configuration are usually provided by components which cannot be intermixed should one component be in short supply and another component be readily available. Additionally, some fiber optic applications have bulkhead mounting connectors, such as receptacles, for intermating with connectors mounted to cable ends. One convenient method of making sure particular cable connections are not crossed at opposite ends of the cables from the panels, or to provide connectors which are of various sizes and configurations such that non-compatible connectors cannot be intermated. This typically requires stocking of different types of connector halves.

SUMMARY OF THE INVENTION

A multi-channel fiber optic connector is provided having a plug connector half and a receptacle connector half. The plug and the receptacle have respective inserts that include exterior peripheries of a particular shape for mating with an interior profile of a housing of the receptacle. The peripheries of the inserts are preferably defined by cylindrical bodies having respective tabs which protrude outward from the outer diameters of the inserts. The interior profile of the receptacle housing defines a recess for receiving the tabs to both angularly align the insert associated with the receptacle and to angularly align the insert associated with the plug. The recess in the receptacle housing is defined by a groove which extends parallel to the longitudinal length of the receptacle housing, with the same groove receiving the protuberant tabs of both inserts to angularly align the inserts. The inserts have fiber optic termini mounted therein. The insert associated with the plug is comprised of a main insert body and an insert cap, with the termini of the respective insert being mounted to the main insert body and alignment sleeves for aligning mating termini being retained in the insert cap. The insert cap includes the tab for fitting in the groove of the receptacle housing, such that the plug may be modified for mating with an alternative receptacle by replacing the insert cap with a corresponding insert having a protuberant tab which is alternatively sized and shaped for fitting in the corresponding groove of the alternative receptacle.

BRIEF DESCRIPTION OF THE DRAWINGS

For a more complete understanding of the present invention and the advantages thereof, reference is now made to the following description taken in conjunction with the accompanying Drawings in which:

FIG. 2 is a longitudinal section view of a first connector half of the fiber optic connector;, FIG. 3 is an end view of a termini retainer for the fiber optic connector;

FIG. 4 is a longitudinal section view of a bushing for securing the termini retainer in the fib optic connector;

DETAILED DESCRIPTION OF THE INVENTION

Figure 1:
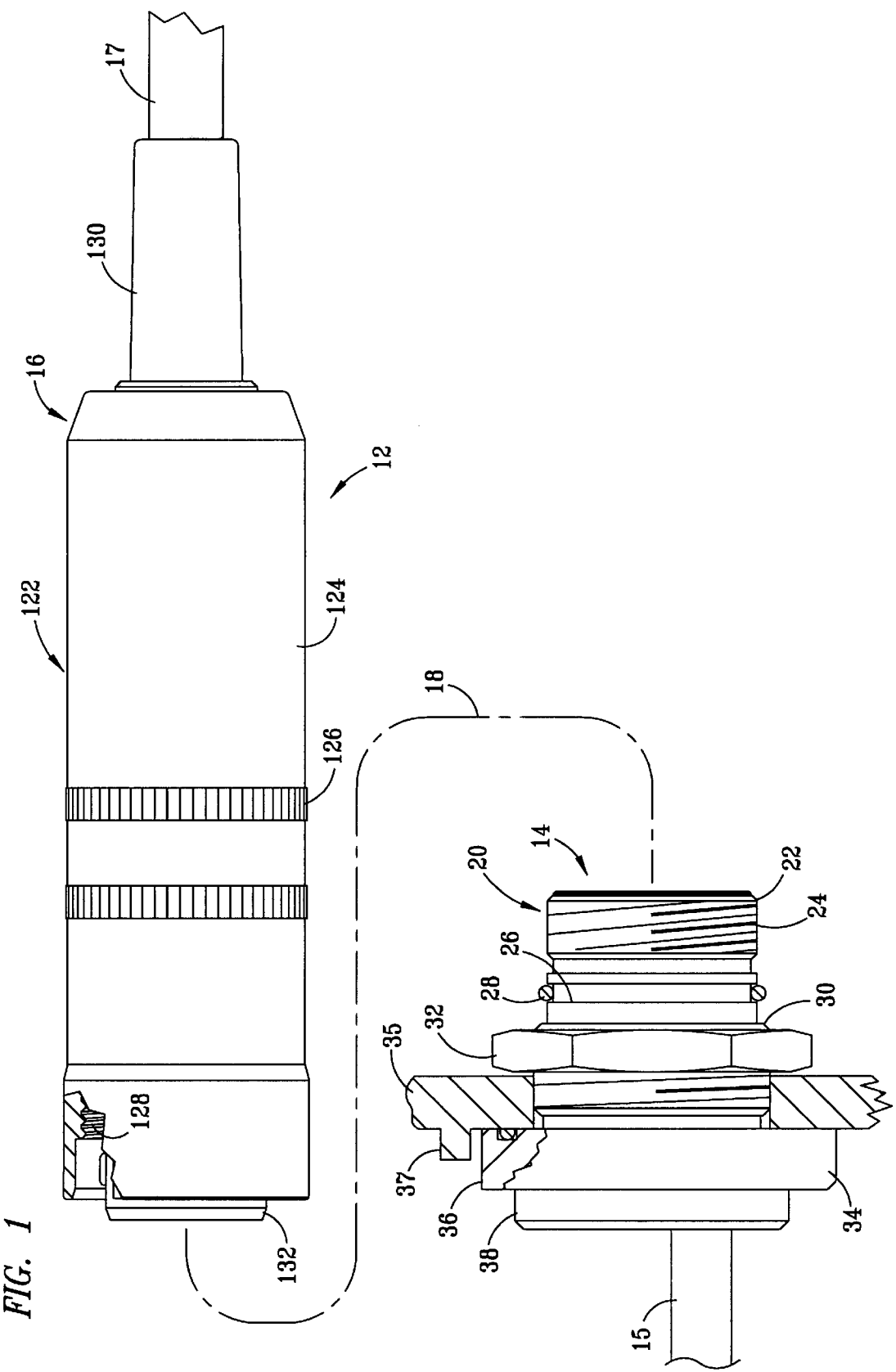
FIG. 1 is a side view of a fiber optic connector having two mating connector halves.

FIG. 1 is a side view of a fiber optic connector 12. The fiber optic connector 12 has first connector half 14 secured to a fiber optic cable 15 and a second connector half 16 secured to a fiber optic cable 17. The first connector half 14 is herein referred to as a receptacle 14, and the second connector half 16 is herein referred to as a plug 16. As used herein, the terms receptacle and plug do not carry the meaning of one being inserted into another for making an electrical connection, but are used together as referring to two mating connector halves, without regard to inner and outer respective positions. The fiber optic connector 12 has a longitudinal axis 18, which is coaxial with the longitudinal axes of the receptacle 14 and the plug 16. The receptacle 14 has a receptacle housing 20, with a first end portion 22 of the receptacle housing 20 having external threads 24 for securing the receptacle 14 to the plug 16. A seal gland 26 is provided on the first end 22 of the housing 20, with a seal member 28 secured therein for sealingly engaging between the receptacle 14 and the plug 16. The seal member 28 is preferably provided by an elastomeric O-ring. The receptacle housing 20 further has a threaded intermediate portion 30 to which a jam nut 32 is threadingly secured. An annular shaped shoulder 34 extends between the threaded intermediate portion 30 and a second end portion 38 of the receptacle housing 20. A flat 36 is provided in the annular-shaped shoulder 34 for placing adjacent to a lineally extending rib 37, such that the receptacle housing 20 of the receptacle 14 will not rotate. The rib 37 lineally extends outward from a wall 35 of a panel to which the receptacle 14 may be mounted. The second end 38 of the receptacle housing 20 is open for passing a fiber optic cable into the receptacle 14.

FIG. 2 is a longitudinal section view of the receptacle 14, which provides the first half of the connector 12. The receptacle 14 has an interior passage 40, which preferably has an enlarged diameter in a first bore 48 of the receptacle housing 20 which is adjacent to the second end 38. The intermediate portion 30 of the receptacle housing 20 and the first end portion 22 together define a second bore 50 having a reduced diameter as compared to that of the diameter of the first bore 48 of the interior passage 40 which is adjacent to the second end 38. A forward face 46 of the annular-shaped shoulder 34 has a seal gland 42 formed therein for receipt of a seal member 44. Preferably, the seal member 44 is provided by an elastomeric O-ring. The reduced diameter of the bore 50 of the interior passage 40 in the receptacle housing 20 defines an interior profile 52 that is preferably generally cylindrical in shape, and coaxial with the longitudinal axis 18 of the fiber optic connector 12. The profile 52 defined by the interior periphery of the bore 50 further has a recess 54 formed therein which preferably extends parallel to the longitudinal axis 18. The recess 54 is preferably a channel provided by a slot or groove which is square or rectangular in cross section, and which preferably extends for the full length of the bore 50 of the interior passage 40.

The receptacle 14 further includes a receptacle insert 58, which is disposed within the interior passage 40 of the housing 20. The receptacle insert 58 has a first end 60 with a reduced diameter, and a second end 62 with a larger diameter, which correspond to the reduced diameter of the bore 50 and enlarged diameter of the bore 48, respectively, of the interior passage 40 of the receptacle housing 20, such that the receptacle insert 58 is slidingly received within the interior passage 40, with the larger diameter of the second end 62 providing a stop to prevent entry into the end 62 of the smaller bore 50. The larger diameter of the second end 62 defines an annular-shaped shoulder 64 which is engaged against the interface of the reduced diameter bore 50 and the enlarged diameter bore 48. The receptacle insert 58 further includes a protuberance defined by a locating tab 66 which extends radially outward from the exterior periphery of the first end 60 in a radial direction with respect to the longitudinal axis 18 of the fiber optic connector 12 and the receptacle insert 58. A plurality of termini bores 68 extend through the receptacle insert 58 in directions which are parallel to and angularly spaced apart around the longitudinal axis 18. The termini bores 68 are provided for receiving termini 70 of the fiber optic conductors of the fiber optic cable 15. In the embodiment shown, eight termini bores 68 are provided for receiving the termini 70 of the eight optical fiber conductors of the singular cable 15. A groove 74 extends into the enlarged diameter bore 48 of the interior passage 40, spaced apart from the bore 50, for receiving a snap ring 72 to secure the annular-shaped shoulder 64 of the receptacle insert 58 against the shoulder defined by the interface between the enlarged diameter bore 48 and the reduced diameter bore 50, which secures the receptacle insert 58 within the interior passage 40 of the receptacle housing 20.

A termnini retainer 76 is provided for securing the various termini 70 within the receptacle insert 58. The termini retainer 76 is secured to the receptacle insert 58 by bushing 78 having a head 80 and a shank 82. The bushing 78 is secured to the receptacle insert 58 by threaded fastener 84, which is threadingly secured within a threaded hole 86 of the receptacle insert 58. The termini retainer 76 has center hole 92 for receipt of the bushing 78. The termini retainer 76 also has an alignment hole 94 which extends through the termini retainer 76 for receipt of a first alignment pin 96. The alignment pin 96 is preferably press-fit into an alignment hole 97 formed into the rearward face of the receptacle insert 58, to angularly align the termini retainers 76 with the receptacle insert 58.

FIG. 3 is an end view of one of the termini retainers 76. The termini retainer 76 shown has the center hole 92 and the alignment hole 94. A plurality of the holes 98 are formed having tapers 100 for receiving various ones of the termini 70. An entrance slot 102 is formed into the peripheral edge 104 of the termini retainer 76 for passing the termini 70 into the holes 98. Openings 106 in the peripheral edge 104 of the termini retainer 76 are defined by the entrance slots 102. The termini retainers 76 have a first planar face 108 (shown in FIG. 2), which faces towards the mating connector half 16 to which the particular termini 70 being retained are being mated thereto. A second planar face 110 faces in the opposite direction to that in which the first planar face 108 is disposed. The taper 100 of the holes 98 is formed into the second planar face 110 such that it is wider at the plane of the second planar face 110 than other portions of the taper 100, and narrows as it extends toward at the plane of the first planar face 108. The taper 100 extends from the plane of the second planar face 110, and ends at the hole 98 prior to reaching the plane of the first planar face 103. (See generally FIG. 2).

FIG. 4 is a longitudinal section view of the bushing 78 for securing the termini retainer 76 to the rearward end of the receptacle insert 58. The bushing 78 is shown has having the head 80 and the shank 82. The shank 82 being of a reduced diameter in respect to the diameter of the head 80. A hole 88 extends through the center of the bushing 78, concentric with a centrally disposed, longitudinal axis 18 of the bushing 78 and the connector 12. The shank 82 of the bushing 78 is sized for fitting within the hole 92, with the forward end of the head 80 fitting adjacent to the rearward facing, second planar face 110 of the termini retainer 76 to secure the termini retainer 76 adjacent to the rearward face of the receptacle insert 58. (See FIG. 2). The forward end of the shank 82 and the bushing 78 fits flush against the rearward end of the receptacle insert 58 and is secured thereto with the fastener 84. The shank 82 preferably has a length which is in the range of 0.002 to 0.006 inches longer than the thickness of the termini retainer 76, which separates the first planar face 108 and the second planar face 110 of the termnini. Since the shank 82 is slightly longer than the thickness of the termini retainer 76, and slidably engaged within the hole 92, the termini retainer 76 is free-floating in a longitudinal direction with respect to the longitudinal axis 18 of the fiber optic cable connector 12. This allows the various termini 70 to align with respect to ones of the termini 70 with which they are being mated.

Figure 5:
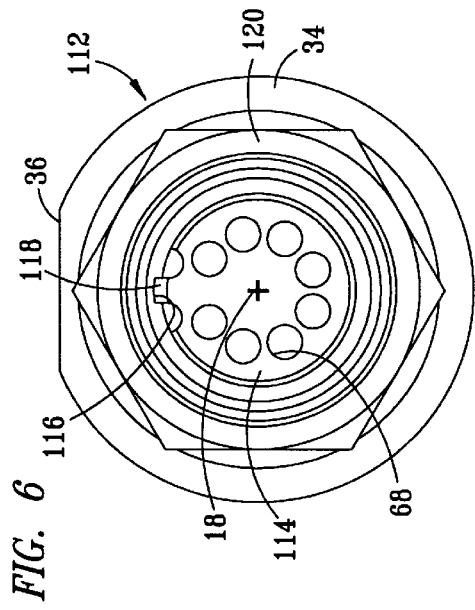
FIG. 5 is an end view of one embodiment of the first connector half of the fiber optic connector.

FIG. 5 is an end view of one embodiment of the receptacle 14, showing the various termnini bores 68 which are formed to extend through the receptacle insert 58. The jam nut 32, the annular-shaped shoulder 34 and the flat 36 formed into the shoulder 34 are also shown. The protuberance defined by the locating tab 66 of the receptacle insert 58 is shown fitting into the recess 54, which is defined by the rectangular-shaped channel formed as a groove into the interior periphery 52 of the receptacle housing 20, to locate the receptacle insert 58 with the receptacle housing 20, in an angular alignment about the longitudinal axis 18.

Figure 6:
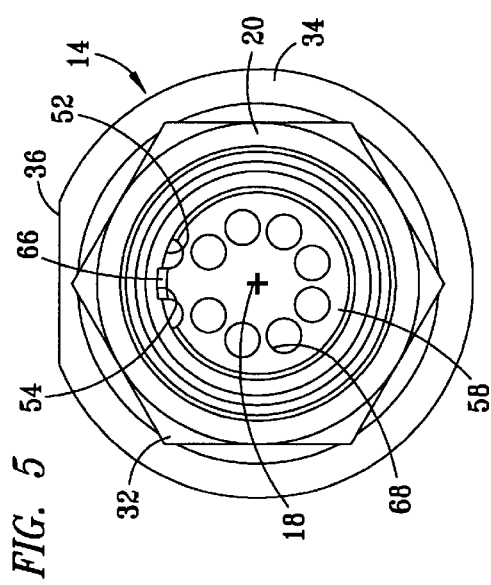
FIG. 6 is an end view of a second embodiment of the first connector half of the fiber optic connector.

FIG. 6 is an end view of an alternative embodiment 112 of the receptacle 14. The receptacle 112 has an alternative receptacle insert 114 having a protuberance defined by a locating tab 118 which is of a different shape than that of the protuberance defined by the locating tab 66 of the insert 58 (shown in FIG. 5). A groove 116 is formed into an alternative receptacle housing 120 having a cross section which is sized and shaped for receiving the locating tab 118 in a sliding engagement therewith. Receipt of the locating tab 118 within the recess 116 angularly aligns the alternative receptacle insert 114 relative to the longitudinal axis 18 of the alternative receptacle housing 120. The locating tab 118 extends in a radial direction with respect to the longitudinal axis 18 of the receptacle housing 120 and the alternative receptacle insert 114.

Referring again to FIG. 1, the plug 16 has a plug housing 122 which includes a coupling sleeve 124. The coupling sleeve 124 has knurled exterior sections 126. Interiorly disposed threads 128 are formed into a forward end of the coupling sleeve 124. A seal boot 130 sealingly engages within a rearward end of the plug housing 122. A plug insert 132 extends within the forward end of the coupling sleeve 124.

Figure 7:
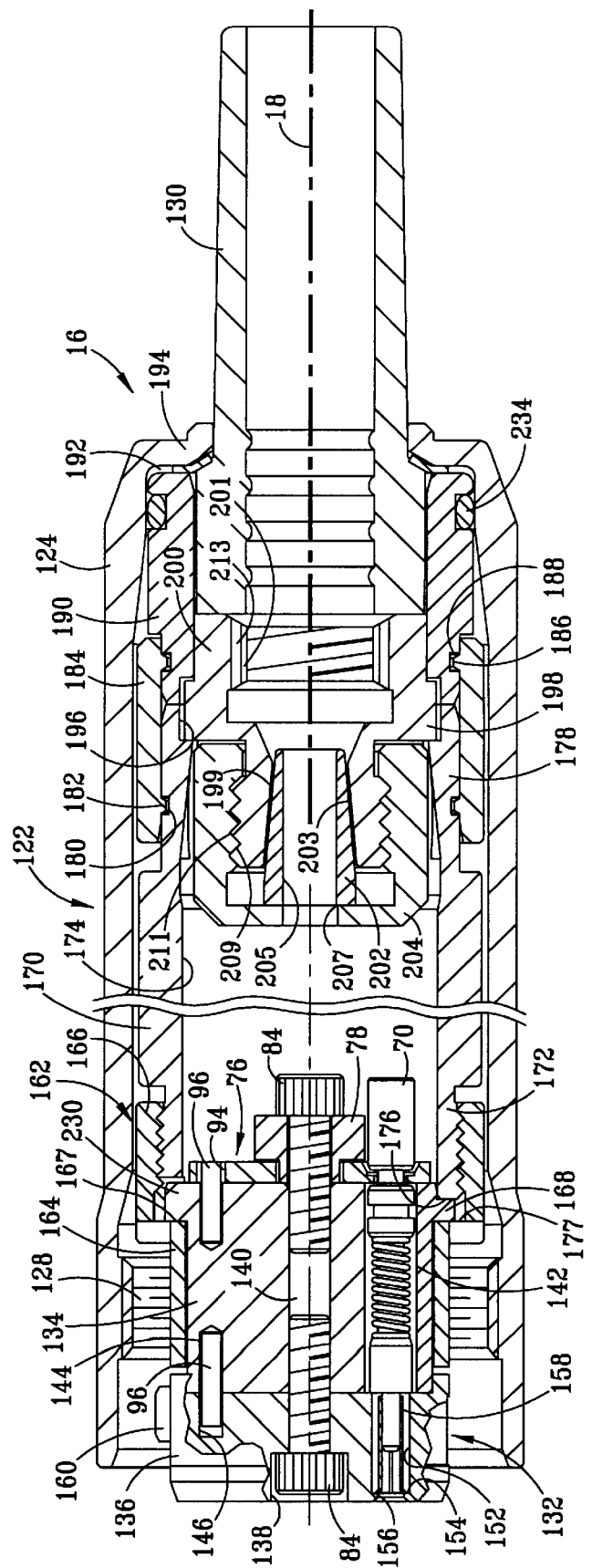
FIG. 7 is a longitudinal section view of a second connector half of the fiber optic connector.

FIG. 7 is a longitudinal section view of the plug 16. The plug insert 132 includes an insert body 134 and insert cap 136. A recessed hole 138 is formed into the forward end of the insert cap 136 for passing a threaded fastener 84. The fastener 84 threadingly engages within a threaded hole 140 formed into the forward end of the insert body 134 to secure the insert cap 136 to the insert body 134. The threaded hole 140 extends through the insert body 134, and is preferably coaxial with the longitudinal axis 18. A plurality of termini bore 142 extend through the insert body 134 for receipt of various ones of the termini 70. Preferably, eight termini bores 143 are provided, which extend in spaced apart angular alignment around the longitudinal axis 18, parallel to the longitudinal axis 18. An alignment hole 144 and an alignment hole 146 are provided in respective ones of the insert body 134 and the insert cap 136 for receipt of a second alignment pin 96 to angularly align the insert cap 136 with respect to the insert body 134.

A plurality of holes 152 through the insert cap 136 are angularly spaced apart around the longitudinal axis 18 in alignment for registering with the termini bores 142 extending through the insert body 134. The holes 152 register in alignment with the bores 142 for receiving respective ones of the termini 70 when the insert cap 136 is angularly aligned with the insert body 134 by the alignment pin 96 fitting within both of the alignment holes 144 and 146. The holes 152 in the insert cap 136 define a chamber having a forward shoulder 154 defined by an aperture 156 which is smaller in diameter than that of the hole 152. Alignment sleeves 158 are retained within the chamber defined by the holes 152 in the insert cap for aligning mating ones of the termini 70 of respective ones of the receptacle 14 and the plug 16. A protuberance is defined by a locating tab 160 which extends radially outward of the insert cap 136 with respect to the longitudinal axis 18 of the insert cap 136 and the plug 16. The protuberance defined by the locating tab 160 is disposed for fitting within the recess 54 formed into the interior periphery 52 of the receptacle housing 20, such that the termini 70 disposed within the plug 16 will be aligned for registering with mating ones of the termini 70 which are disposed within the receptacle 14.

Figure 8:
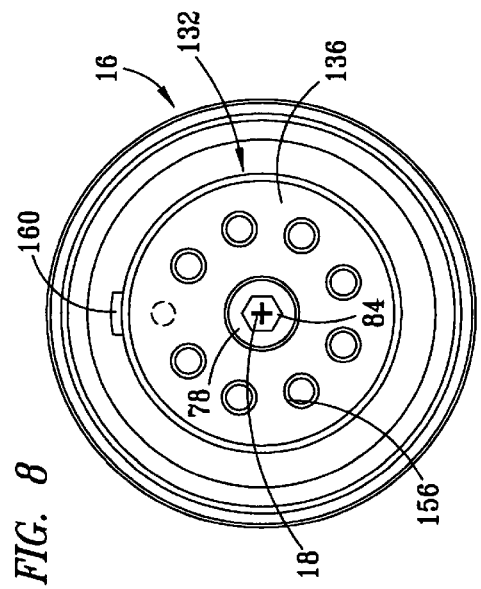
FIG. 8 is an end view of one embodiment of the second connector half of the fiber optic connector.

FIG. 8 is an end view of the plug 16 providing the second half of the connector 12. The protuberance 160 extends radially outward of the main body portion of the insert cap 136 for fitting within the recess 54 in the receptacle 14 (shown in FIG. 5). The bores 156 are angularly spaced apart around the longitudinal axis 18 for registering with the bores 68 of the receptacle 14. The longitudinal axis 18 extends perpendicular to the plane of FIG. 8.

Figure 9:
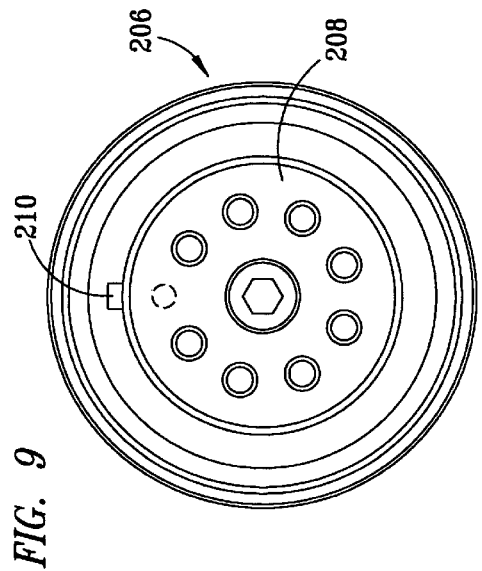
FIG. 9 is an end view of a second embodiment of the second connector half of the fiber optic connector.

FIG. 9 is an end view of an alternative embodiment 206 to the plug 16, showing an alternative insert cap 208 which is secured to the insert body 134 in place of the insert cap 136 (shown in FIG. 7). The insert cap 208 includes an alternative protuberance defined by a locating tab 210 which is of a shape for slidingly engaging within the recess 116 formed into the alternative retainer housing 120 (shown in FIG. 6). In other embodiments, other sizes and shapes for locating tabs and recesses may be selected, such that a particular plug may be modified for mating with receptacles housings which are keyed for receiving locating tabs of such other sizes and shapes.

Referring again to FIG. 7, an insert retainer 162 has a forward end 164 and a rearward end 166. The rearward end 166 has internal threads for threadingly securing to an inner sleeve 170 of the plug housing 122. The forward end 164 of the insert retainer 162 is of a smaller diameter than the rearward end 166 to define a rearwardly disposed shoulder 167 which engages against an annular-shaped shoulder 168 of the insert body 134. A locating tab 230 extends rearward of the annular shoulder 168 of the insert body 134 (shown in a top portion of the insert body 134 of FIG. 7), for engaging within a locating notch 228 in the forward end of an inner sleeve 170 of the plug housing 122. (See FIGS. 10 and 11).

The inner sleeve 170 of the plug housing 122 is preferably cylindrical and coaxially disposed with the central longitudinal axis 18 of connector 12. A forward end 172 of the inner sleeve 170 has exterior threads for engaging with the interior threads of the rearward end 166 of the insert retainer 162. A bore 174 extends through the inner sleeve 170 to define an interior chamber of the plug housing 122. A shoulder 176 defined on the terminal, forward end of the inner sleeve 170 and a rearward end 177 of the forward end 164 of the insert retainer 162 are spaced apart by a gap within which the annular shoulder 168 of insert body 134 is retained to secure the insert body 134 to the inner sleeve 170 in a longitudinal direction with respect to longitudinal axis 18. The locating tab 230 of the insert body 134 engages within the locating notch 228 (see FIG. 10) of the forward end 172 of the inner sleeve 170 to angularly align the plug insert body 134 with respect to the inner sleeve 170 and the longitudinal axis 18. A groove 180 defines a recess which circumferentially extends into an exterior circumference of the inner sleeve 170 of a rearward end 178 of the inner sleeve 170.

A seal retainer 184 is preferably cylindrical in shape, and formed of plastic. The seal retainer 184 has two inwardly extending ribs defined by annular-shaped locating tabs 182 and 186. The locating tab 182 extends into the annular-shaped groove 180 formed into the rearward end 178 of the inner sleeve 170. The annular-shaped locating tab 186 extends into an annular-shaped groove 188 formed into a rear seal body 190.

The rear seal body 190 has a rearward end which is engaged with a conically-shaped washer 192. A flange 194 of the rearward end of the coupling sleeve 124 extends radially inward from a rearward end of the sleeve 124 for retaining the conically-shaped washer 192 against the rearward end of the rear seal body 190 and retaining the seal boot 130 within the rear seal body 190. The interior surface of the rear seal body 190 is sealingly engaged by the seal boot 130, which also sealingly engages against the fiber optic cable 17 to which the plug 16 is connected (see FIG. 1).

A cable retainer 200 is secured to the inner sleeve 170 and the rear seal body 190. A gap 196 circumferentially extends as a notched section formed into the interior of the rearward end 178 of the inner sleeve 170 to provide a space within which a central portion 198 of the retainer 200 is disposed. The central portion 198 preferably has an exterior which is hexagonal in shape (see FIG. 16). The retainer 200 has an interior passage 201. Threads 213 are preferably formed in the interior passage 201. Typically, a fiber optic cable will have eight optical conductors and a KEVLAR™ sheath which extends around the exterior of the fiber optic conductors, and within a protective outer armor. The outer armor is typically formed of plastic and is cut on make-up with the plug 16. The outer armor will preferably be cut from around the. KEVLAR™ sheath and the fiber optic conductors, to either extend into the interior passage 201 and beyond the threads 213 if the outer armor is not bonded to the KEVLAR™ sheath, or such that the outer armor does not extend beyond the rearward end of the retainer member 200 if the outer armor is bonded to the KEVLAR™ sheath. Thus, if the outer armor is not bonded to the KEVLAR™ sheath which extends around the fiber optic conductors, the threads 213 will hold the outer armor in place with respect to the KEVLAR™ sheath and the fiber optic conductors, once the KEVLAR™ sheath is secured to the retainer 200.

A conically-shaped member 202 is mounted within the forward end of the retainer 200, and held in place within the forward end of the retainer 200 by a retainer cap 204. The conically-shaped member 202 has an exterior periphery 199 which is conically shaped to provide a wedge for extending within a conically shaped interior profile 203 defined in the forward end of retainer 200. The retainer cap 204 has interior threads 209 for threadingly engaging exterior threads 211 formed into the forward end of the retainer 200 to secure the conic member 202 within the conically shaped interior profile 203 of the retainer 200. The optical conductors of the fiber optic cable pass through the hole 205 in the conic member 202, and through the hole 207 in the forward end of the retainer cap 204. The KEVLAR™ sheath of the fiber optic cable will preferably not pass through the hole 105, but instead will pass between the conically shaped exterior periphery 199 of the conic member 202 and the conically shaped interior profile 203 of the forward end of the retainer 200. The retainer cap 204 will be tightened to wedge the KEVLAR™ sheathing between the conically shaped exterior periphery 199 of the conic member 202 and the conically shaped interior profile 203 of the retainer member 200. This will rigidly secure the fiber optic cable within the plug housing 122 by wedging the KEVLAR™ sheath between the conically-shaped member 202 and the retainer 200. The KEVLAR™ sheath preferably exits from between the retaining cap 204 and the retainer 200, passes through the hole 207, and then is trimmed after the cap 204 is tightened onto the retainer 200.

A second termini retainer 76 is secured to the reward end of the insert body 134 by a second terminus retainer bushing 78 and a second threaded fastener 84. The terminus retainer bushing 78 fits within the center hole 92 (see FIG. 3) of the termini retainer 76 and the threaded fastener 84 fits within the threaded hole 140 to secure the bushing 78 to rearward end of the insert body 134. The length of the shank 82 (see FIG. 4) of the bushing 78 is 0.002 to 0.006 inches longer than the thickness of the terminus retainer 76, such that the terminus retainer 76 is free to float or move slightly in a longitudinal direction with respect to the longitudinal axis 18, such that the corresponding termini 70 retained by the terminus retainer 76 are free to move angularly for self-alignment along the longitudinal axis 18.

Figure 10:
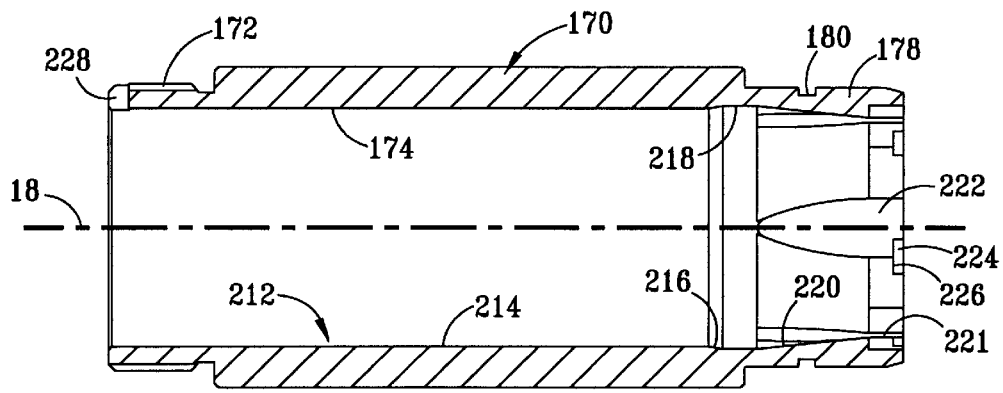
FIG. 10 is a longitudinal section view of an inner sleeve of a plug housing for the second connector half.
Figure 11:
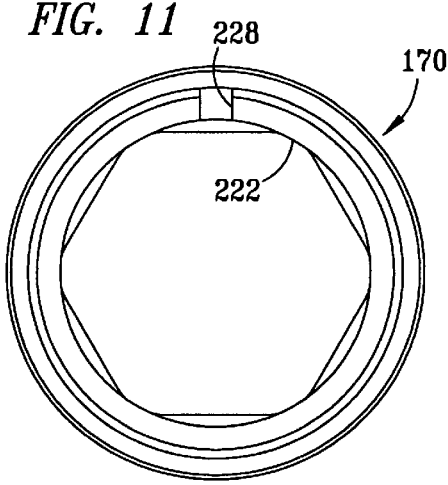
FIG. 11 is a forward end view of the inner sleeve of the plug housing.
Figure 12:
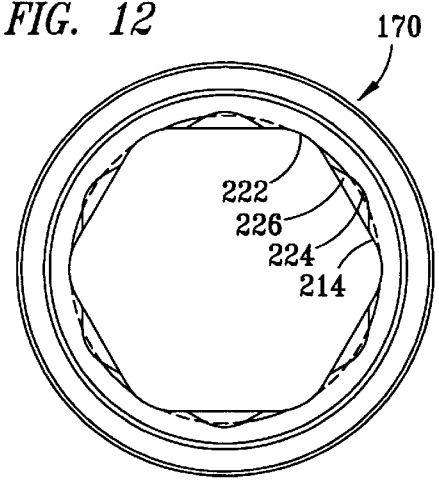
FIG. 12 is a rearward end view of the inner sleeve of the plug housing.

FIGS. 10, 11 and 12 are a longitudinal section view, a forward end view and a rearward end view, respectively, of the inner sleeve 170 of the plug housing 122. The bore 174 of the inner sleeve 170 has a first section 214 with a constant internal diameter, a second section 216 which has an outward taper in a rearward direction, such that it enlarges in diameter in moving toward the rearward end 178 of the inner sleeve 170. The bore 174 further has a third section 218 which is of a constant diameter. The bore 174 further includes a fourth section 220 which has an inner diameter which tapers such that it decreases in size as it extends toward a rearward end 178 of the inner sleeve 170. A rearward-most end portion of the bore 174 includes a fifth section 221 which is of a constant internal diameter. A plurality of recesses 222 are milled into the fourth section 220 and the fifth section 221 for passing a hexagonally-shaped central portion 198 of the retainer 200. (See FIGS. 15 and 16). The first section 214 of the bore 174 has the profile 212 of a constant diameter which is larger than the largest diameter of the retainer 200. Notches 224 are formed into the rearward most end of the inner sleeve 170, into the bore 174. There are six of the notches 224 which are angularly spaced apart equal distances about the central longitudinal axis 18 for receiving the forward end of the hexagonally-shaped central portion 198 of the retainer 200, such that the retainer will be retained between the forward end of the notches 224 and the forward end of the rear seal body 190 when disposed in the notches 224. The notches 224 define rearward facing shoulders 226. The notch 228 formed in the forward end 172 of the inner sleeve 170 receives the rearward facing tab 230 from the annular shoulder 168 of the insert body 134.

Figure 13:
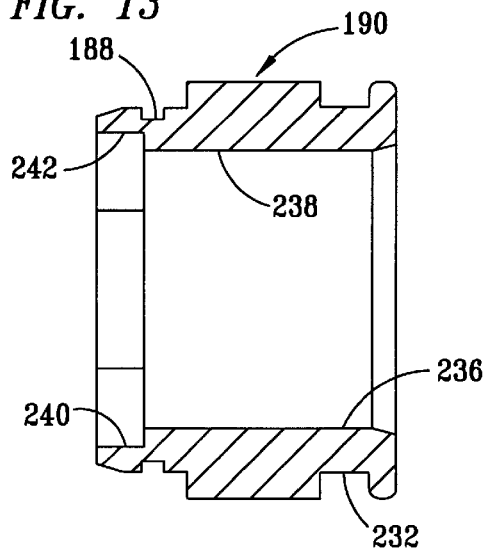
FIG. 13 is a longitudinal section view of a rear seal body of the plug housing.
Figure 14:
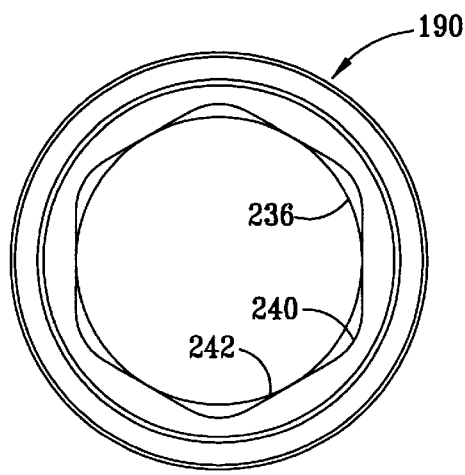
FIG. 14 is a front view of the seal body.

FIGS. 13 and 14 are a longitudinal section view and a forward end view of the rear seal body 190, respectively. A rearward portion of the rear seal body 190 has an exterior surface into which is formed a seal gland 232 for receiving a seal member 234 (see FIG. 7), such as an elastomeric O-ring seal. The forward end of the seal body 190 has an exterior groove 188 formed therein. The interior surface of the forward end of the seal body 190 has a forward profile 240 defined by flats 242 formed therein. There are six flats 242 which are spaced annularly apart to define a hexagonal shape for receiving a rearward portion of the hexagonally-shaped central portion 198 of the retainer 200. (See FIGS. 14 and 16).

Figure 15:
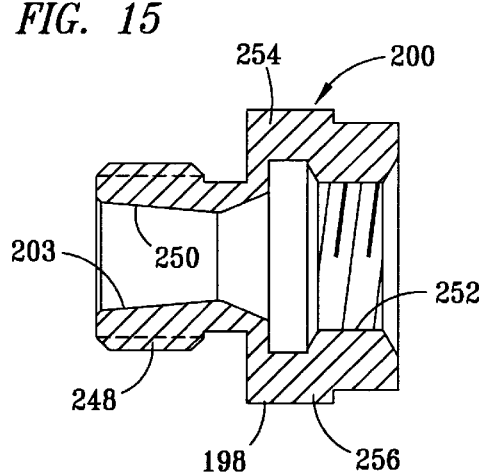
FIG. 15 is a longitudinal section view of a fiber optic cable retainer of the plug housing.

FIG. 15 is a longitudinal section view of the retainer 200. The retainer 200 has a forward end 248 having exterior threads for receiving and threadingly securing to the interior threads of the retainer cap 204 (shown in FIG. 7). An interior passage 250 extends longitudinally through the retainer 200. The forward end of the interior passage 250 has a conically shaped interior profile 203 for receiving a mating exterior profile defined by the conically shaped exterior periphery 199 of the conic member 202. The rearward end portion of the interior passage 250 has interior threads 252 which preferably have a sharp, V-shaped cross section such that they will bite into the exterior plastic armor of a conventional fiber optic cable.

Figure 16:
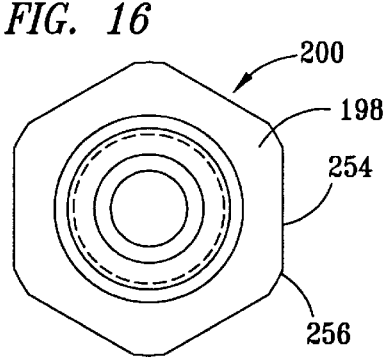
FIG. 16 is a front view of the fiber optic cable retainer of the plug housing.

FIG. 16 is an end view of the retainer 200. The central portion 198 of the retainer 200 has an hexagonally-shaped periphery 254 defined by flats 256 formed into the exterior surface of the central portion 198.

Figure 17:
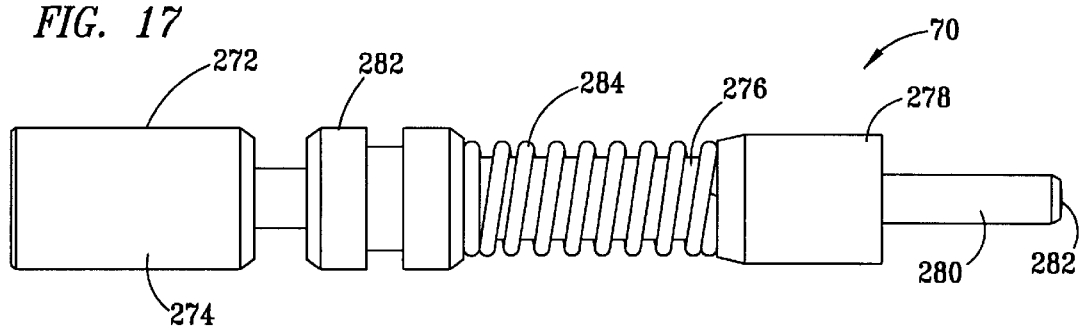
FIG. 17 is a side view of a terminus for use in the fiber optic cable connector.

FIG. 17 is a side view of a terminus 70 for use in the connector 12 of the present invention. The terminus 70 has a pin body 272 having a large rearwardly disposed portion 274 and a smaller, forwardly disposed portion, which defines a shank 276. A bonnet 278 is pressed onto the terminal end of the forward portion 276 of the pin body 272. A ferrule 280 extends around a single fiber optic conductor of the multi conductor cable to which the particular terminus 70 has been secured. A spring 284 and a slip collar 282 are placed on the shank 276 of the pin body 272 prior to pressing the bonnet 278 onto the end portion of the shank 276. The spring 284 is shown in a somewhat compressed state. In being mounted within the connector 12, the rearward end of the shank 276 of the pin body 272 will be passed through one of the openings 106 and into one of the slots 102, and then into one of the holes 98 of the terminus retainer 76. (See FIG. 3). The terminus 70 is mated against another one of the termini 70, at a face 282, which defines a mating plane within the adjacent one of the termini 70. The pin body 272 will be pushed such that the terminus retainer 70 is pressed against the rearward end of the slip collar 282 to compress the spring 284.

Figure 18:
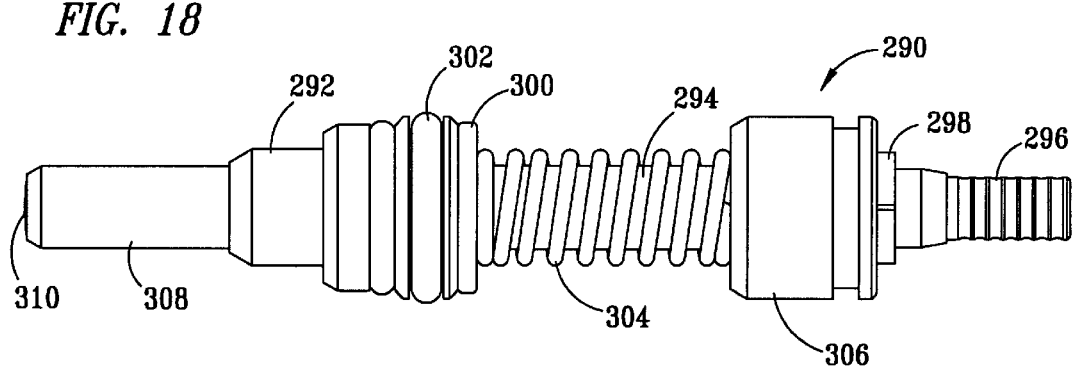
FIG. 18 is a side view of an alternative terminus for use in the fiber optic cable connector.

FIG. 18 is a side view of an alternative terminus 290 which may be used in the connector 12 of the present invention. The terminus 290 has a pin body 292 having a larger forward end and a smaller internal diameter section 294 which extends rearward, to an end tip portion 296. A retainer ring 298 is placed on the end portion of the pin body 292 to retain a clamping washer 300, a spring 304 and a slip collar 306 around the smaller portion 294 of the pin body 292. A seal member 302, preferably provided by an O-ring, is disposed around a forward end portion of the pin body 292. A ferrule 308 is mounted to the terminal end of one of the conductors of the fiber optic cable. The alternative terminus 290 is secured to a terminus retainer within one of the holes 98 at the terminus retainer 76 (see FIG. 3), by sliding the slip collar 306 forward to leave a gap between the rearward end of the slip collar 306 and the forward end of the retaining ring 298.

Figure 19:
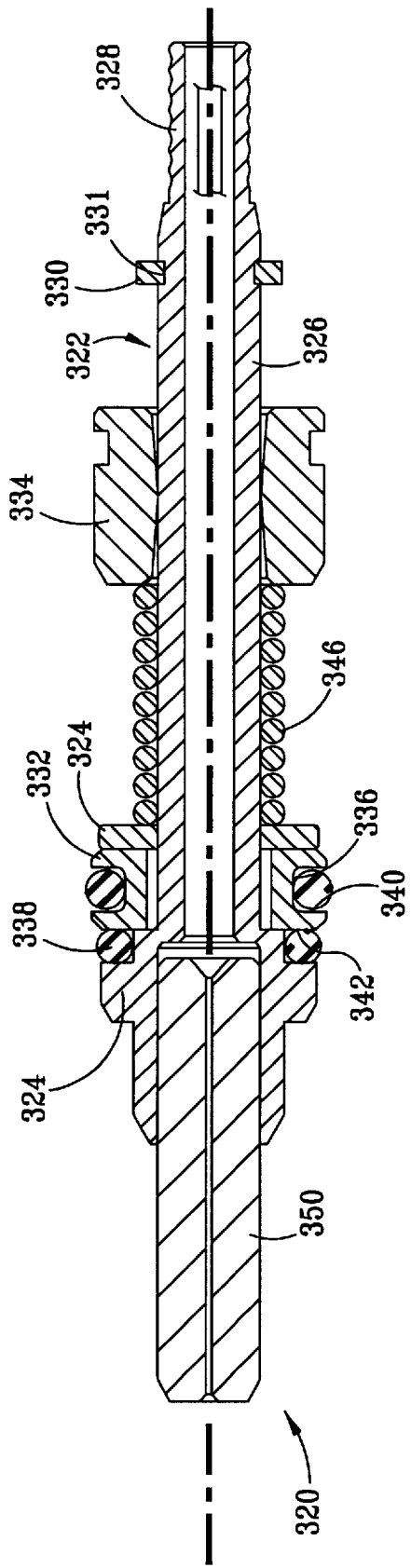
FIG. 19 is a side view of an alternative embodiment of a terminus for use in the fiber optic connector.

FIG. 19 is a longitudinal section view of an alternative terminus 320.

Terminus 320 has a pin body 322 having an enlarged forward end portion 324, an intermediately sized shank 326, and a tip portion 328. A retainer ring 330 is disposed in a groove 331 formed into a rearward end portion of the shank 326 of the pin body 322. The retainer ring 330 retains a seal collar 332, a washer 324, a spring 346 and a slip collar 334 on the shank 326 of the pin body 322. (The spring 346 is shown in a compressed state such that there is a gap between the slip collar 334 and retaining ring 330.) The seal collar 332 has an O-ring 336 disposed in a seal gland 340. A seal member 338 is disposed in a seal gland 342 defined between a rearward end portion of the head 324 of the pin body 322 and a forward end face of the seal collar 332 for sealing therebetween. The O-ring 336 provides a seal member which sealingly engages between the seal gland 340 and an internal diameter of the terminus bore of one of the receptacle insert 58 or the insert body 134. A ferrule 350 is mounted to a terminal end portion of one of the optical fibers.

Figure 21:
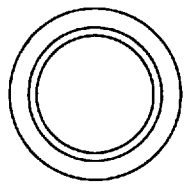
FIG. 21 is an end view of the alignment sleeve of FIG. 20.
Figure 20:
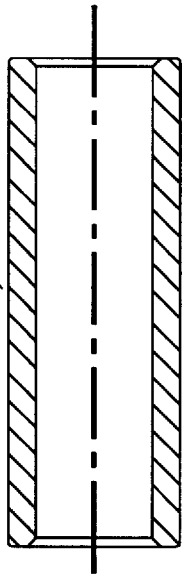
FIG. 20 a longitudinal section view of an alignment sleeve for aligning ferrules of two mating termini, the alignment sleeve a continuous, annular-shaped cross-section.

FIGS. 20 and 21 are a longitudinal section view and an end view, respectively, of an alignment sleeve 158 having a continuous annular-shaped cross-section. The aligned sleeve is preferably formed of ceramic and fits over two mating ferrules 280 of mating ones of the termini 70 to align the mating termini for passing optic signals therebetween.

Referring to FIGS. 7, 8 and 9, the plug of the fiber optic connector 12 may be modified for fitting within an alternative receptacle 112, instead of the receptacle 14, by replacing the insert cap 136 with an alternative insert cap 208. The insert cap 136 may be replaced by the insert cap 208 without requiring disassembly of the termini 70 from within the insert body 134 and from within the inner sleeve 170. The threaded fastener 84 may be removed from securing the insert cap 136 to the insert body 134, and then the insert cap 136 removed. The insert cap 208, with the alignment sleeves 158, may then be secured to the forward end of the insert body 134 by first aligning an alignment hole of the insert cap 208, which corresponds to the alignment hole 146 of the insert cap 136, with the pin 96, which protrudes from the hole 144 in the insert body 134. This aligns the termini bores of the insert cap 208 with those in the insert body 134, such that the ferrules of the respective termini 70 will be received within the alignment sleeves 158 retained within the insert cap 208. Then, the insert cap 208 is secured to the insert body 134 with the threaded fastener 84. This will dispose the tab 210 of the insert cap 208 on the forward end of the insert body 134, to modify the plug 16 to become the plug 206, without requiring disassembly of the termini 70 from within the other components of the plug 16.

Although the preferred embodiment has been described in detail, it should be understood that various changes, substitutions and alterations can be made therein without departing from the spirit and scope of the invention as defined by the appended claims.

What is claimed is:

1. A fiber optic cable connector for optically coupling a first set of optical conductors to a second set of optical conductors, the connector comprising:

a receptacle housing having a first end, a second end and an interior passage, and said interior passage extending from said first end to said second end of said receptacle housing and defining a central axis and an interior periphery of said receptacle housing;

said interior periphery of said receptacle housing including a recess which extends into said receptacle housing from said first end of said receptacle housing and on one side of said interior passage in a radial direction with respect to said central axis of said receptacle housing, and parallel to said central axis;

a receptacle insert secured within said interior passage of said receptacle housing and having receptacle termini bores for receiving termini secured to respective ones of the first set of optical conductors which pass through said second end and into said interior passage of said receptacle housing, said receptacle termini bores being angularly spaced apart around said central axis of said receptacle housing;

a plug housing having a forward end, a rearward end and a tubular body, said tubular body defining a longitudinal axis of said plug housing;

a plug insert secured to a forward end of said plug housing and having plug termini bores which are angularly spaced apart around and aligned parallel to said longitudinal axis of said plug housing which are configured for registering in alignment with said receptacle termini bores for receiving end portions of said termini secured to respective ones of the second set of optical conductors which extend through a rearward end of said plug housing, and an insert cap having insert cap bores which have alignment sleeves enclosed therein and which are configured in an angularly spaced apart alignment for registering with said receptacle termini bores and said plug termini bores for receiving into opposite ends of said alignment sleeves end portions of said termini which are disposed in respective ones of said receptacle termini bores and said plug termini bores;

said insert cap being nonrotatably secured to a first one of said receptacle insert and said plug insert, angularly aligned for receiving said end portion of respective termini from said first one of said receptacle insert and said plug insert;

one of said insert cap and said first one of said receptacle insert and said plug insert to which said insert cap is secured having a first exterior periphery which includes a first protuberance extending radially outward therefrom and configured for being slidably received within said recess of said interior periphery of said interior passage of said receptacle housing for angularly aligning said insert cap and said first one of said receptacle insert of said plug insert with said receptacle housing;

a second one of said receptacle housing and said plug housing having a second protuberance extending radially outward therefrom and configured for being slidably received within said recess of said interior periphery of said interior passage of said receptacle housing for angularly aligning said second one of said receptacle insert and said plug insert with said receptacle housing with end portions of respective ones of said termini aligned for being received within said alignment sleeves enclosed within said insert cap; and a coupling sleeve extending exteriorly around one of said receptacle housing and said plug housing for coupling to the other of said receptacle housing and said plug housing.

2. The fiber optic cable connector of claim 1, wherein said recess is defined by a lineally extending channel formed into said receptacle housing.

3. The fiber optic cable connector of claim 1, wherein said insert cap is nonrotatably secured to said forward end of said plug insert.

4. The fiber optic cable connector of claim 3, further comprising an angular alignment pin extending between mating holes formed into respective ones of said plug insert and said insert cap to prevent rotation therebetween.

5. The fiber optic cable connector of claim 3, wherein said second protuberance is defined by a locating tab which is part of and extends outward from said receptacle insert.

6. The fiber optic cable connector of claim 5, wherein said coupling sleeve ends around said plug housing, from said rearward end of said plug housing to said forward end thereof, for coupling to said first end of said receptacle housing.

7. A fiber optic cable connector for optically coupling a first set of optical conductors to a second set of optical conductors, the connector comprising:

a receptacle housing having a first end, a second end and an interior passage, said first end being threaded and said interior passage extending from said first end to said second end of said receptacle housing and defining an interior periphery and a central axis of said receptacle housing;

said interior periphery of said receptacle housing including a recess formed to extend into said receptacle housing on one side of said interior passage in a radial direction with respect to said central axis of said receptacle housing, said recess further extending parallel to said central axis from said first end of said receptacle housing;

a receptacle insert secured within said interior passage of said receptacle housing and having receptacle termini bores angularly spaced apart around said central axis of said receptacle housing for receiving termini mounted to the first set of the optical conductors which passes through said second end and into said interior passage of said receptacle housing;

said receptacle insert having a receptacle insert exterior periphery which includes a first protuberance that extends radially outward of a central portion of said receptacle insert, and into said recess in said interior periphery of said receptacle housing to angularly align said receptacle termini bores relative to said receptacle housing;

a plug housing having a forward end, a rearward end and a tubular body, said tubular body defining a longitudinal axis of said plug housing;

a plug insert secured to a forward end of said plug housing and having plug termini bores which are angularly spaced apart around and aligned parallel to said longitudinal axis of said plug housing in a configuration for registering in alignment with said receptacle termini bores for receiving termini secured to respective ones of the second set of optical conductors which extend through said rearward end of said plug housing;

an insert cap nonrotatably secured to said plug insert, forward of said plug insert, and having insert cap bores which have alignment sleeves enclosed therein, said insert cap bores being configured in an angularly spaced apart alignment for registering with said receptacle termini bores and said plug termini bores for receiving into opposite ends of said alignment sleeves end portions of respective ones of said termini which are disposed in respective ones of said receptacle bores and said plug termini bores;

said insert cap having an insert cap exterior periphery which includes a second protuberance which extends radially outward from a central portion of said insert cap for slidably receiving within said recess of said interior periphery of said interior passage of said receptacle housing for angularly aligning said insert cap and said receptacle insert with said receptacle housing, in registration with said receptacle insert; and a coupling sleeve extending exteriorly around said plug housing, from said rearward end to said forward end of said plug housing, said coupling sleeve having a threaded forward end for coupling to said first end of said receptacle housing to secure said plug housing to said receptacle housing.

8. The fiber optic cable connector of claim 7, wherein said protuberances and said recesses have cross-sections which are rectangular in shape.

9. The fiber optic cable connector of claim 7, further comprising:

two termini retainers, a first one secured to an inward end of said receptacle insert and a second one secured to a rearward end of said plug insert, each of said two termini retainers having a plurality of retainer holes formed therethrough, each termini retainer having one of said hole s of which is centrally disposed in a respective one of said termini retainers, and others of said holes of which are angularly spaced apart around a central axis of respective ones of said termini for registering with respective ones of said receptacle termini bore and said plug termini bore;

two bushings, each having a head portion and a shank portion, with respective said shanks portions of said bushings extending through respective ones of said central holes and said head portions retaining said termini retainers upon respective ones of said receptacle insert and said plug insert, wherein said terminal end portions of said shanks of said bushings fit flush against end faces of respective ones of said receptacle insert and said plug insert and said shanks are slightly longer than thicknesses of said termini retainers, such that said termini retainers are free to move for slight distances along said shanks of said bushings; and respective fasteners for securing said bushings to respective ones of end faces at said receptacle housing and said plug housing, with said termini retainers disposed therebetween.

10. The fiber optic cable connector of claim 9, further comprising slots which extend from respective peripheral edges of said termini retainers and into said retainer bores for receiving respective termini into said retainer bores.

11. The fiber optic cable connector of claim 10, wherein said termini retainers further comprise respective alignment pin holes for receiving alignment pins which extend from a second end of said receptacle insert and from a rearward end of said plug insert.

12. The fiber optic cable connector of claim 7, further comprising a rear seal assembly disposed in said rearward end of said plug housing, and a rearward seal element extending between said rearward end of said plug housing and said coupling sleeve for sealingly engaging therebetween.

13. The fiber optic cable connector of claim 12, further comprising a forward seal element extending between said threaded forward end of said coupling sleeve and said retainer housing for sealingly engaging therebetween.

14. The fiber optic cable connector of claim 12, wherein said rearward seal assembly comprises an elastomeric seal boot for sealingly engaging between said rearward end of said plug housing and the first one of the fiber optic cables.

15. The fiber optic cable connector of claim 14, wherein said rearward end of said plug housing includes an inner plug housing, a rear seal body and a rear seal retainer, said rear seal retainer securing said rear seal body to said inner plug housing, and said rear seal body disposed between and sealingly engaged by said rearward seal element and said elastomeric seal boot.

16. A fiber optic cable connector for optically coupling a first set of optical conductors to a second set of optical conductors, the connector comprising:

a receptacle housing having a first end, a second end and an interior passage, said first end being threaded and said interior passage extending from said first end to said second end of said receptacle housing and defining an interior periphery and a central axis of said receptacle housing;

said interior periphery of said receptacle housing including a groove formed to extend into said receptacle housing on one side of said interior passage in a radial direction with respect to said central axis of said receptacle housing, said groove further extending parallel to said central axis from said first end of said receptacle housing;

a receptacle insert secured within said interior passage of said receptacle housing and having receptacle termini bores angularly spaced apart around said central axis of said receptacle housing for receiving termnini mounted to the first set of the optical conductors which passes through said second end and into said interior passage of said receptacle housing;

said receptacle insert having a receptacle insert exterior periphery which includes a first tab that extends radially outward of a central portion of said receptacle insert, and into said groove in said interior periphery of said receptacle housing to angularly align said receptacle termini bores relative to said receptacle housing;

a plug housing having a forward end, a rearward end and a tubular body, said tubular body defining a longitudinal axis of said plug housing;

a plug insert secured to a forward end of said plug housing and having plug termini bores which are angularly spaced apart around and aligned parallel to said longitudinal axis of said plug housing in a configuration for registering in alignment with said receptacle termnini bores for receiving termini secured to respective ones of the second set of optical conductors which extend through said rearward end of said plug housing;

a first insert cap nonrotatably secured to said plug insert, forward of said plug insert, and having insert cap bores which have alignment sleeves enclosed therein, said insert cap bores being configured in an angularly spaced apart alignment for registering with said receptacle termini bores and said plug termini bores for receiving into opposite ends of said alignment sleeves end portions of respective ones of said termini which are disposed in respective ones of said receptacle bores and said plug termini bores;

said first insert cap having a first insert cap exterior periphery which includes a second tab which extends radially outward from a central portion of said insert cap and which is sized for being slidably receiving within said groove of said interior periphery of said interior passage of said receptacle housing for angularly aligning said first insert cap and said receptacle insert with said receptacle housing, in registration with said receptacle insert;

wherein said first insert cap is removably secured to said plug insert, such that said first insert cap may be replaced with a second insert cap which is keyed for fitting within an alternative groove of an alternative receptacle housing into which said first insert cap is not slidably received; and a coupling sleeve extending exteriorly around said plug housing, from said rearward end to said forward end of said plug housing, said coupling sleeve having a threaded forward end for coupling to said first end of said receptacle housing to secure said plug housing to said receptacle housing.

17. The fiber optic cable connector of claim 16, wherein said first insert cap is secured to said plug insert with a threaded fastener.

18. The fiber optic cable connector of claim 17, further comprising:

two termini retainers, a first one secured to an inward end of said receptacle insert and a second one secured to a rearward end of said plug insert, each of said two termini having a plurality of retainer holes formed therethrough, each termini retainer having one of said holes of which is centrally disposed in a respective one of said termini retainers, and others of said holes of which are angularly spaced apart around a central axis of respective ones of said termini for registering with respective ones of said receptacle termini bore and said plug termini bore;

two bushings, each having a head portion and a shank portion, with respective said shanks portions of said bushings extending through respective ones of said central holes and said head portions retaining said termini retainers upon respective ones of said receptacle insert and said plug insert, wherein said terminal end portions of said shanks of said bushings fit flush against end faces of respective ones of said receptacle insert and said plug insert and said shanks are slightly longer than thicknesses of said termini retainers, such that said termini retainers are free to move for slight distances along said shanks of said bushings; and respective fasteners for securing said bushings to respective ones of end faces at said receptacle housing and said plug housing, with said termini retainers disposed therebetween.

19. A method for adapting a first fiber optic connector half for mating with a second fiber optic connector half, comprising the steps of:

providing a first fiber optic connector half having a first housing, an insert body which is secured within the first housing, and a first insert cap which is secured to a forward end of the insert body, the insert body retaining termini of a fiber optic cable and the insert cap retaining alignment sleeves for mating ones of the termini;

providing the second connector half having a second housing with an interior profile which is shaped for slidably receiving a termini insert of the second connector and for slidably receiving a second insert cap, and for not receiving the first insert cap;

releasing the first insert cap from being secured to the forward end of the insert body and from the first housing;

removing the insert cap from the forward end of the insert body and from the first housing;

aligning the second insert cap with the insert body, with the alignment sleeves disposed within the second insert cap for receiving corresponding ones of the termini secured to the insert body;

engaging the second insert cap against the insert body, with the corresponding ones of the corresponding ones of the termini, which are secured to the insert body, being disposed within respective ones of the alignment sleeves secured within the second insert cap; and securing the second insert cap to the forward end of the insert body and to the first housing, such that the second insert cap will slidably engage the interior profile of the second housing for receiving the ones of the termini which are secured to the termini insert, which is also slidably received within the interior profile of the second housing.

20. The method of claim 19, wherein the interior profile of the second housing is provided with a groove which extends parallel to a longitudinal axis of the second housing, and the second insert cap is provided with a protuberant tab which extends outward from the second insert cap for being slidably received within the groove.

* * * * *